United States Patent [19]

Suzuki

[11] Patent Number: 4,557,940

[45] Date of Patent: Dec. 10, 1985

[54] FISH SLURRY PROCESSING METHOD

[75] Inventor: Teisuke Suzuki, Montebello, Calif.

[73] Assignee: JAC Creative Foods, Inc., Los Angeles, Calif.

[21] Appl. No.: 441,411

[22] Filed: Nov. 15, 1982

[51] Int. Cl.⁴ .................. A22C 25/00; A22C 25/22
[52] U.S. Cl. .................................. 426/513; 426/517; 426/802; 426/643; 425/319
[58] Field of Search ............... 426/643, 502, 512, 513, 426/514, 517, 802, 805

[56] References Cited

U.S. PATENT DOCUMENTS

| | | | |
|---|---|---|---|
| 2,868,650 | 1/1959 | Hammerberg | 426/513 |
| 3,684,527 | 8/1972 | Walter | 426/643 |
| 3,796,812 | 3/1974 | Baensch | 426/643 |
| 4,362,752 | 12/1982 | Sugino et al. | 426/643 |

Primary Examiner—Raymond Jones
Assistant Examiner—Marianne M. Cintins
Attorney, Agent, or Firm—William W. Haefliger

[57] ABSTRACT

A fish paste or slurry is processed to form a product having the palate consistency and taste of crab meat.

5 Claims, 7 Drawing Figures

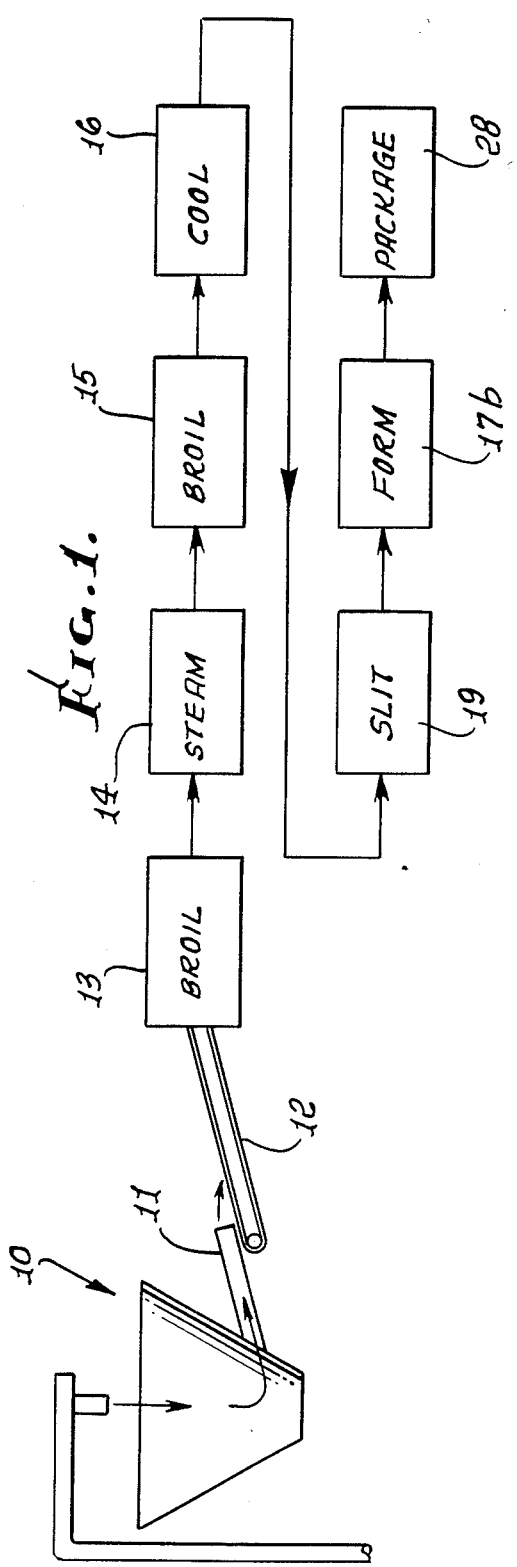
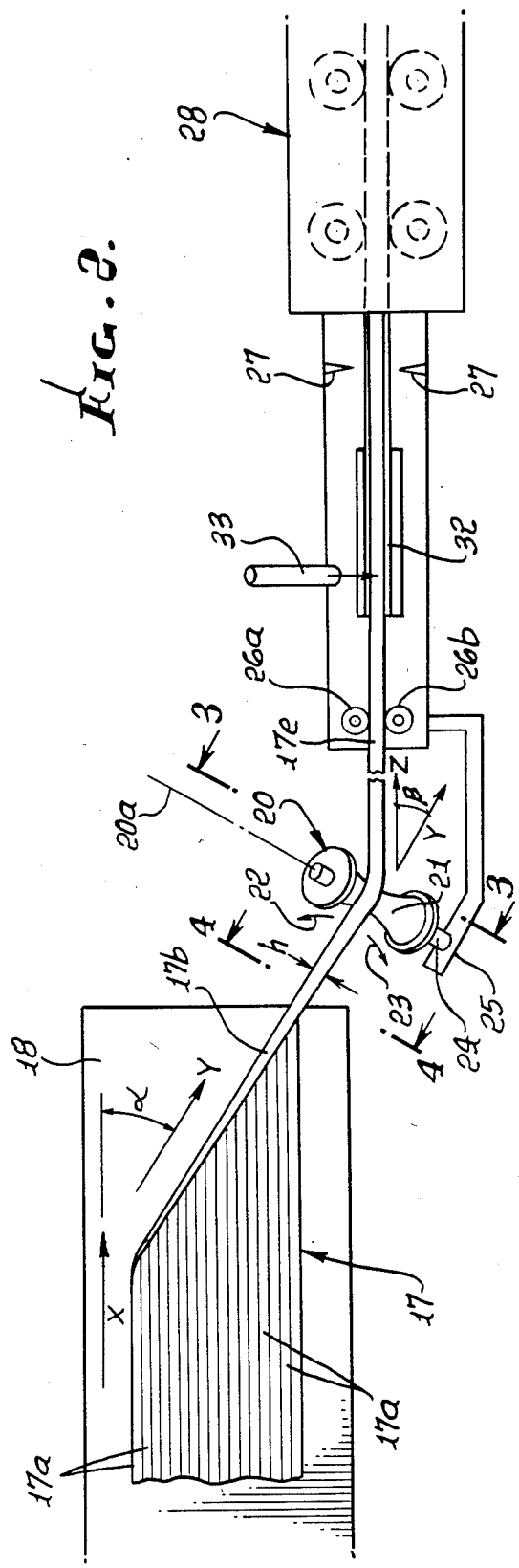

FISH SLURRY PROCESSING METHOD

BACKGROUND OF THE INVENTION

This invention relates generally to processing of fish, and more particularly to the use of fish paste or slurry in the formation of an affordable fish product.

It is well known that crab meat is a highly sought and desirable food, for use as in salads, casseroles, etc; however, crab meat is extremely expensive and unaffordable to much of the population. There is need for an affordable fish meal or meat product which closely approaches or simulates the taste and palate consistency of crab meat, and which is much less expensive than crab meat.

SUMMARY OF THE INVENTION

It is a major object of the invention to provide process and apparatus which is effective to produce the sought simulated crab meat.

This object is met by the following basic process employing an inexpensive paste or slurry made by milling or comminuting cheaper fish such as walleye pollack, etc, by:

(a) forming the paste or slurry into a thin coherent sheet, (b) traveling the sheet in a direction "x"

(c) progressively folding the traveling sheet to produce a spiral convolution sheet roll traveling a direction "y" which extends at an angle α relative to the direction "x", (d) and processing said roll, including cutting off sections thereof.

As will appear, it is important that the convolutions of the formed roll be wound tightly together to adhere to one another, and to this end side loading is exerted on the traveling roll in the manner to be described. For example, the side loading may be exerted by employing a roller sidewardly engaging the roll and turning the direction of roll travel into a direction "z" which extends at an angle β relative to said direction "y". The roller typically has a rolling axis and an annular surface that is outwardly concave away from said axis in axial planes, the method including the step of allowing the sheet roll to twist and move back and forth along said surface to limited extent such that such side loading is exerted on different side portions of the roll tending to tighten the convolutions into a coherent roll. Further pulling force is typically exerted on the sheet roll traveling in said direction "z" and at a spacing from said roller such that said back and forth movement and said twisting are accommodated.

It is another object to supply additional fish paste onto the sheet immediately prior to the roll formation, thereby to cause said convolutions to adhere together in response to the side loading. Such supply of added fish paste is typically effected in streams applied onto the traveling sheet and so that the applied streams have wavy patterns lengthwise of the traveling sheet, the overall width of said patterns encompassing the bulk of the overall width of the sheet.

In its apparatus aspects, the invention includes:

(a) first means for forming the paste or slurry into a coherent sheet and for traveling the sheet in a direction "x", and (b) second means for effecting progressive folding of the traveling sheet to produce a spiral convolution sheet roll traveling in a direction "y" which extends at an angle α relative to said direction "x".

The second means typically includes structure positioned to exert side loading on the traveling roll to press together said spiral convolutions; and such structure may include a roller as referred to above.

These and other objects and advantages of the invention, as well as the details of an illustrative embodiment, will be more fully understood from the following specification and drawings, in which:

DRAWING DESCRIPTION

FIG. 1 is a flow diagram;

FIG. 2 is a plan view showing progressive forming of a thin sheet of fish paste;

DETAILED DESCRIPTION

Figure 3:
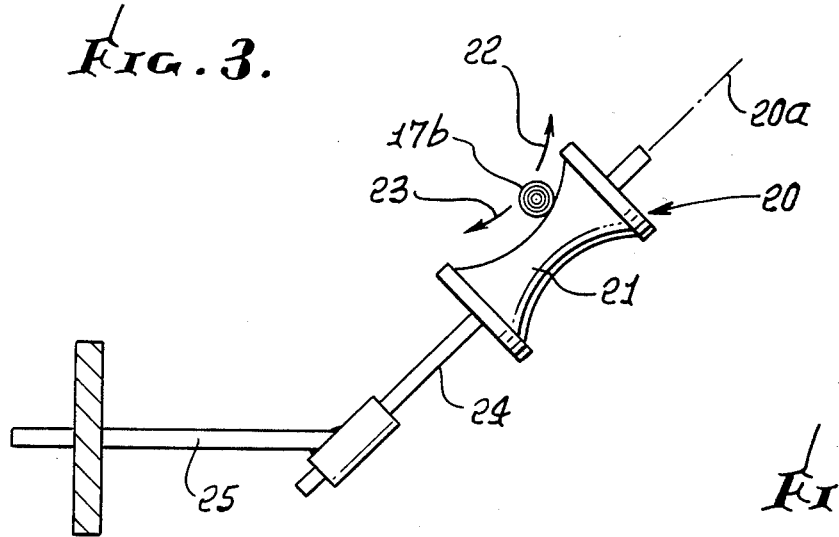
FIG. 3 is an enlarged section taken on lines 3—3 of FIG. 2.

The apparatus for processing fish paste or slurry to produce a fish product (as for example simulated crab meat) includes first means for forming the paste or slurry into a coherent sheet. Such means may include a fish meat grinder or mixer 10 operable to comminute relatively cheap meat, such as walleye pollack, or mackeral, for example. A crab flavoring may be added to the batch in the mixer. The resultant paste or slurry is extruded at 11 onto a conveyor 12 and subjected to broiling at 13 (between 148° F. and 155° F.); steam treatment at 14; repeat broiling at 15 (between 152° F. and 158° F.); and cooling at 16. Such processing produces a coherent sheet 17 of fish paste seen in FIG. 2 as traveling rightwardly in direction "x" on conveyor surface 18. The sheet is somewhat adherent to that surface due to its prior processing, as described. Preferably, the sheet is also slit at 19 into narrow side-by-side ribbons 17a, of thickness between 1.3 and 1.7 millimeters.

Figure 4:
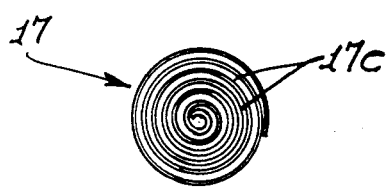
FIG. 4 is a further enlarged section taken on lines 4—4 of FIG. 2.

Also provided is second means for effecting progressive folding of the traveling sheet, to produce a spiral convolution elongated sheet roll 17b traveling endwise in a direction "y", which extends at an angle α to the direction "x". Such folding and roll formation peels the sheet or sheet ribbons off the conveyor surface due to endwise tugging of the roll exerted in direction "y". Typically, the roll has a resultant cross dimension "h" of about ¼ inch to 1 inch (for example to simulate the thickness of a crab leg). FIG. 4 shows the sheet convolutions 17c wound in a spiral and adherent to one another due to the moistened, tacky surface condition of the coherent sheet or sheet ribbon. Angle α is typically between 30° and 60°.

The second means referred to may with unusual advantage include structure positioned to exert side loading on the endwise traveling roll to press together the spiral convolutions, whereby a coherent roll is formed. Such structure is shown to include, for example, a roller sidewardly engaging the roll, and turning the direction of roll travel into or toward a direction "z", which extends at an angle β relative to direction "y". As shown, the roller 20 has an axis of rolling 20a, and an annular surface 21 (at about a 90° skew angle relative to direction "y") that is outwardly concave away from that axis, in axial planes. The roll 17b engages that concave surface and is allowed to twist (about its length axis) and to move back and forth along the surface (see arrows 22 and 23), to a limited extent, such that the side loading is exerted on different side portions of the roll 17b tending to tighten the convolutions into the desired coherent roll form (simulating a solid cross section fish product, such as a crab leg, for example). To this end, angles α and β are adjusted to aid in achievement of the above functioning and result. The roller 20 freely rotates as on a spindle 24, suitably supported as at 25.

Also shown in FIG. 2 are pinch rolls 26a and 26b engageable with the formed roll 17e traveling in direction "z", and which may be driven to draw the roll 17b over the roller 20, as described. A paper strip 32 may be applied about the roll 17e, and liquid coloring added at 33 to the roll in the paper strip (partly opened to receive the coloring), to give the white meat roll an external color, such as "crab red". The roll may then be slit (as by knives 27) into desired lengths, which are finally packaged at 28.

Figure 6:
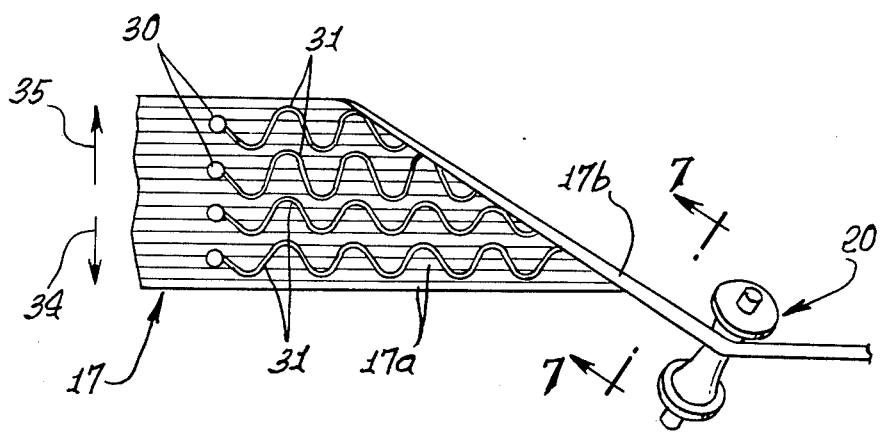
FIG. 6 is a plan view showing the wavy strips of bonding fish paste on the traveling sheet.
Figure 7:
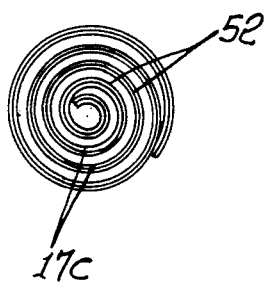
FIG. 7 is a section taken on lines 7—7 of FIG. 6.
Figure 5:
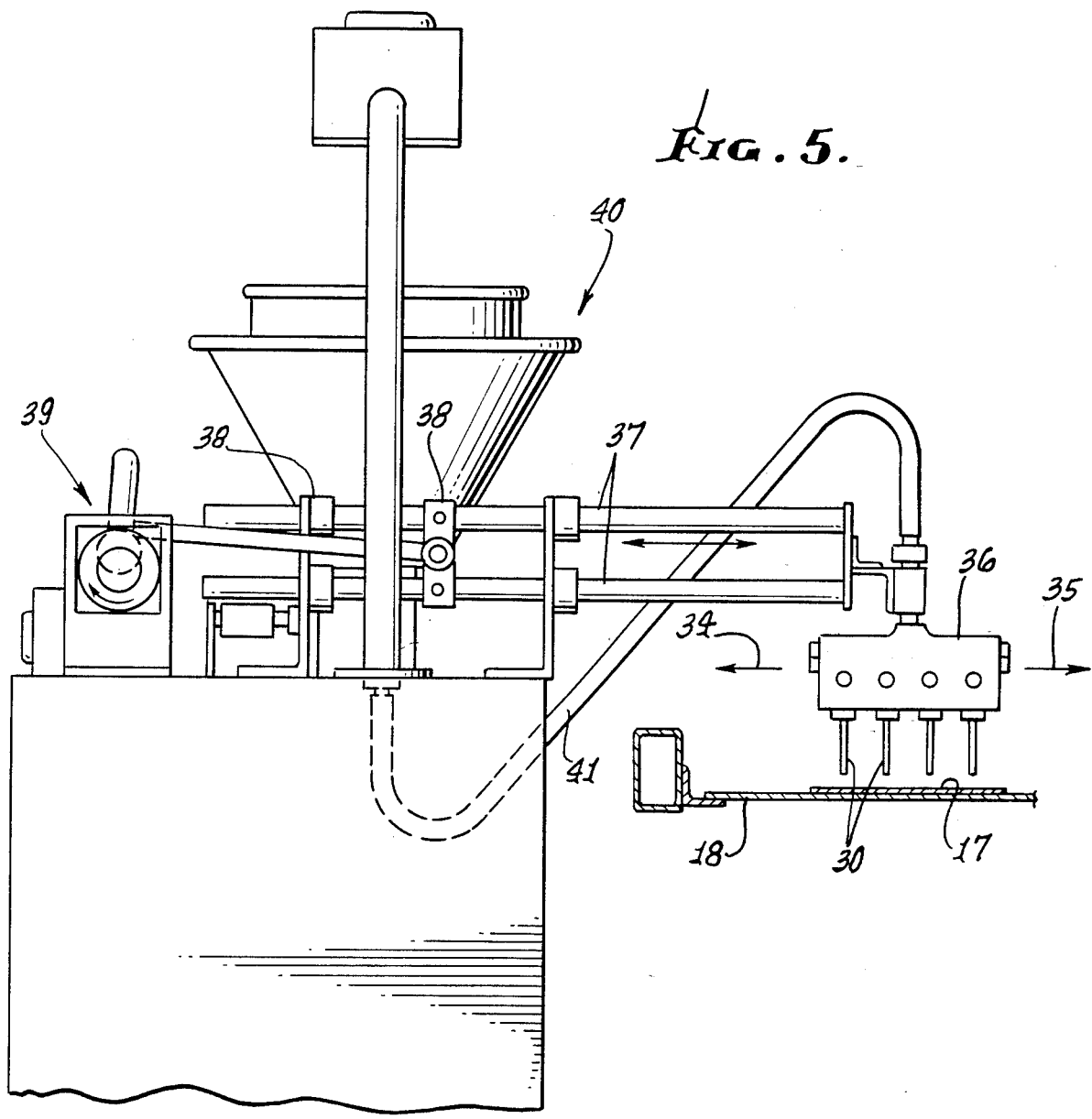
FIG. 5 is a side elevation showing movable application of bonding fish paste to the traveling sheet prior to spiral forming of the sheet.

FIGS. 5 to 7 show the addition of means for supplying additional fish paste (highly viscous and tacky) onto the sheet 17 immediately prior to formation of roll 17b, thereby to cause the convolutions 17c to better adhere together in response to roll formation and side loading exertion as described. Such means may include multiple fish plaste extruders 30 (see FIG. 5) spaced laterally apart to supply the added fish paste in streams on the traveling sheet. See for example streams 31 in FIG. 6. Extruder displacing mechanism may be provided to displace the extruders back and forth crosswise of the sheet 17 (see arrows 34 and 35 in FIG. 6, to produce wavy streams patterns on the sheet. The wave amplitudes are such that the streams collectively encompass or extend across the bulk of the lateral width of the sheet (or sheet ribbons). Such displacement mechanism is shown in FIG. 5 to include a head 36 carried by plungers 37 moved back and forth in slides 38 by a drive 39. A fish paste supply includes a source 40, feed line 41, and head 36 containing ducts leading to the extruders.

FIG. 7 shows the added fish paste 52 between the convolutions and tending to bond them together when pressed laterally by the roller 20.

The roller 20 may advantageously have a NYLON surface engaging the roll 17b for optimum operation of the apparatus and method.

I claim:

1. A method of processing fish paste or slurry to produce a fish product, comprising the steps of:
   (a) forming said paste or slurry into a thin coherent sheet traveling in a direction "x" and around a roller, said roller having a rolling axis and an annular surface and is outwardly concave away from said axis in axial planes,
   (b) progressively folding the traveling sheet to produce a spiral convolution sheet roll traveling in direction "y" which extends at an acute angle α between 30° and 60° relative to direction "x",
   (c) exerting side loading on the traveling roll traveling in direction "y" to press together said spiral convolutions, said side loading exertion being carried out by employing said roller surface to sidewardly engage the roll and cause turning of the direction of roll travel into a direction "z" which extends at angle β relative to said direction "y", thereby allowing the sheet roll to twist and move back and forth on said roller surface to a limited extent such that said side loading is exerted on different side portions of the roll to tighten said convolutions into a coherent roll,
   (d) supplying additional fish paste onto said sheet immediately prior to said roll formation thereby to cause said convolutions to adhere together in response to said side loading,
   (e) and cutting off sections of the roll traveling in direction "z".

2. The method of claim 1 including exerting a pulling force on the sheet roll traveling in said direction "z" and at a spacing from said roller such that said back and forth movement and said twisting are accommodated.

3. The method of claim 1 including traveling said sheet in said direction "x" on a traveling support surface to which said sheet is caused to adhere until it is forcibly pulled off said surface by the formation of the roll traveling in said direction "y".

4. The method of claim 3 including subjecting said sheet to heating and cooling to cause the sheet to adhere to said surface.

5. The method of claim 1 wherein said supplying of said additional fish paste is effected by supplying the same in streams applied onto the traveling sheet such that the applied streams have wavy patterns lengthwise of the traveling sheet, the overall widths of said patterns encompassing the bulk of the overall width of the sheet.

* * * * *